P. R. SIMMONS.
MILK BOTTLE CAP TUBING MACHINE.
APPLICATION FILED MAR. 23, 1918. RENEWED JUNE 3, 1921.
1,399,586.
Patented Dec. 6, 1921.
2 SHEETS—SHEET 2.
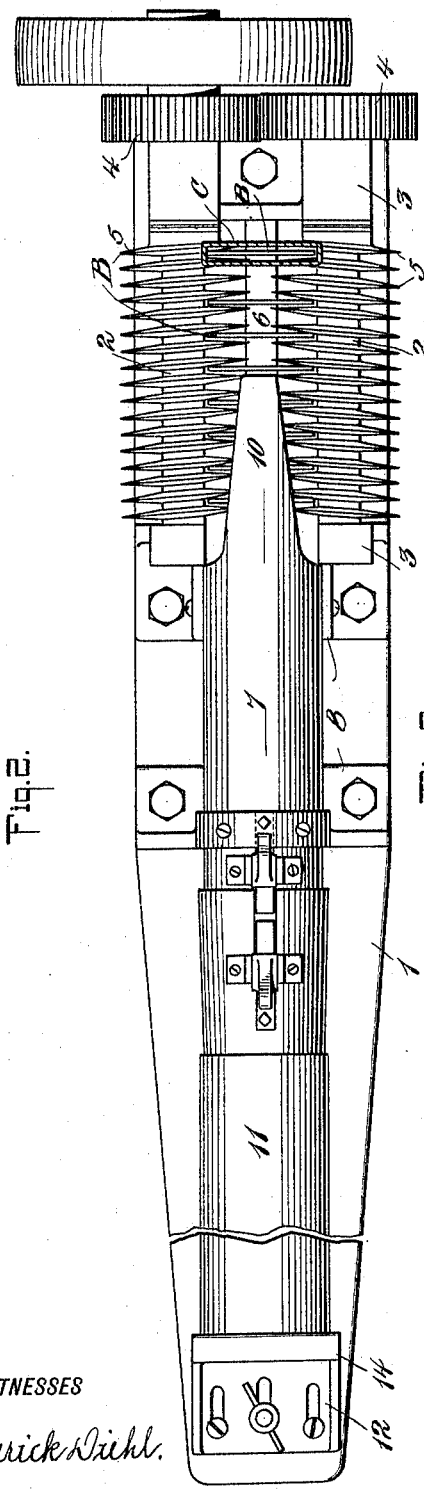
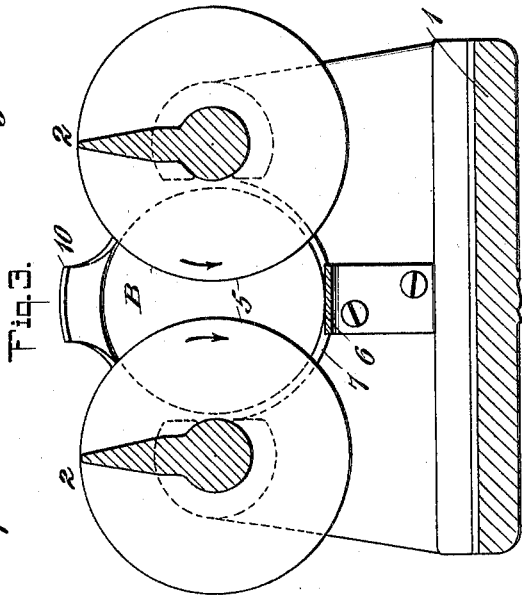
WITNESSES
Frederick Diehl.
C. Bradway.
INVENTOR
Paul R. Simmons
BY Munn & Co
ATTORNEYS

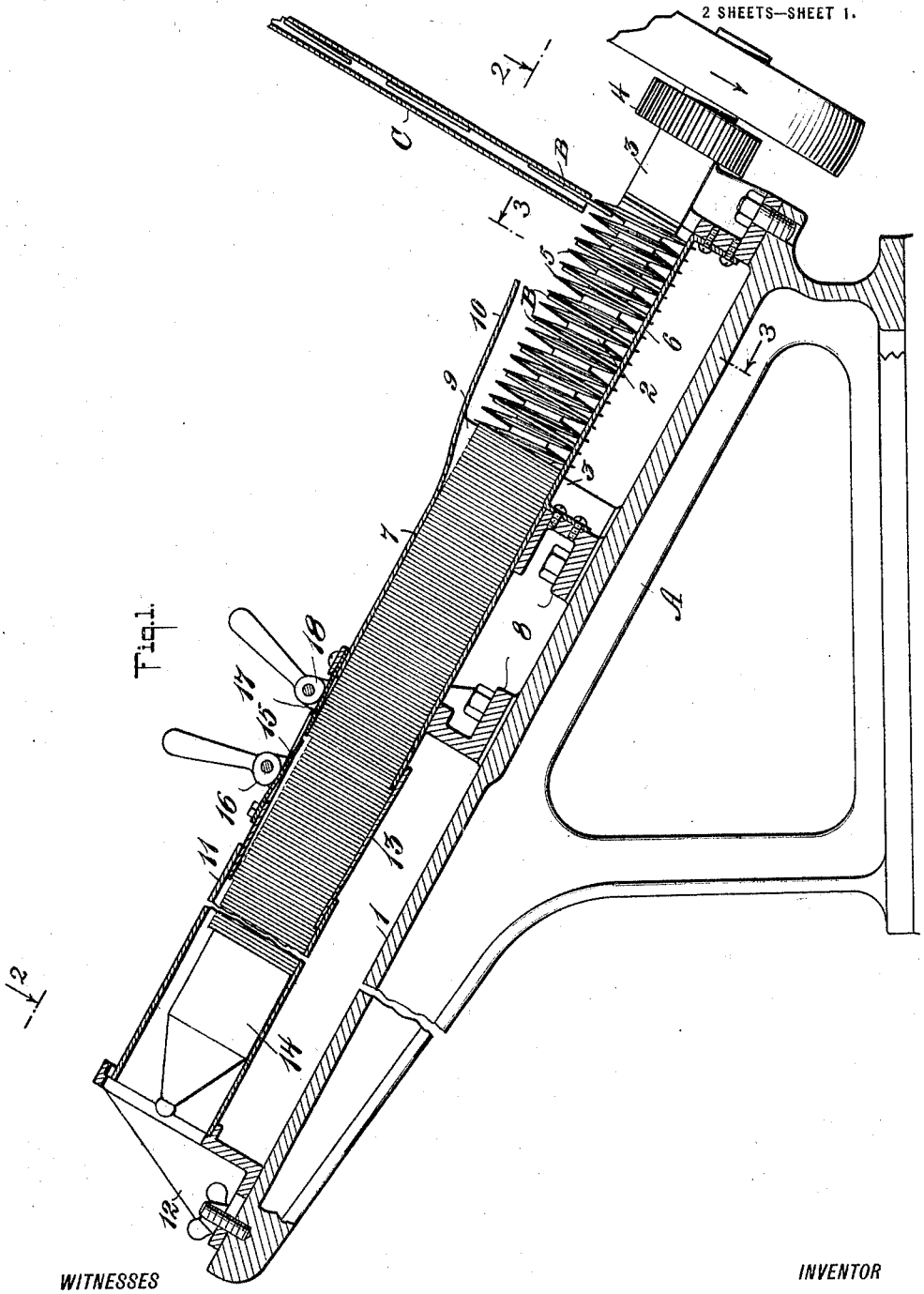

UNITED STATES PATENT OFFICE.

PAUL RAYMOND SIMMONS, OF HUNTINGTON, INDIANA.

MILK-BOTTLE-CAP-TUBING MACHINE.

1,399,586.   Specification of Letters Patent.   Patented Dec. 6, 1921.

Application filed March 23, 1918, Serial No. 224,274. Renewed June 3, 1921. Serial No. 474,764.

*To all whom it may concern:*

Be it known that I, PAUL R. SIMMONS, a citizen of the United States, and a resident of Huntington, in the county of Huntington and State of Indiana, have invented a new and Improved Milk-Bottle-Cap-Tubing Machine, of which the following is a full, clear, and exact description.

This invention relates to a machine which is adapted to be used in connection with a milk bottle cap-making machine for the purpose of receiving the caps and packing them into a tube or other container.

The invention has for its general objects to provide a machine of this character which is of comparatively simple construction, reliable and efficient in use, and so designed as to operate at a high rate of speed without clogging.

A more specific object of the invention is the provision of a machine embodying a pair of oppositely rotating parallel screws spaced apart so that the bottle caps can be dropped into the space between the screws, to be engaged by the threads thereof, whereby the threads convey the caps through a guide, which directs them into a shipping tube or other container in an even and orderly manner.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a central vertical section of the machine;

Fig. 2 is a sectional view on the line 2—2, Fig. 1; and

Fig. 3 is a transverse section on the line 3—3, Fig. 1.

Referring to the drawings, A designates a frame of any suitable construction and which embodies an inclined table 1 on which various parts of the machine are supported.

At the bottom of the table are two parallel screws 2 having their ends journaled in bearings 3 fastened to the table 1, the screws being connected together by gears or equivalent means 4 so that they will both simultaneously rotate in opposite directions. The threads 5 of the screws are reversely arranged to each other, and the axes of the screws are so spaced apart as to permit the bottle caps B to drop between the screws with the centers of the caps in substantially the same plane with the axes of the screws, whereby the edges of the caps will intermesh with the threads 5, so that the caps will be fed forwardly as the screws rotate. A support or platform 6 is disposed centrally between the screws so that the bottle caps will ride upwardly on this support 6, with the caps all parallel and the bottom edges resting on the support.

The feed screws 2 conduct the bottle caps into a tubular guide 7 mounted on the brackets 8 and having its axis disposed centrally between the screws. At the mouth or receiving end 9 of this guide 7 is a guiding finger 10 which lies above the screws and serves the purpose of directing any cap downwardly to enter the guide 7 if a cap for any reason should not drop through to the support 6.

The shipping tube 11 is suitably applied to the upper end of the tubular guide 7 in axial relation thereto, so that the bottle caps B can pass from the guide into the tube. This tube has its upper end removably held in a bracket 12, and the lower end fits around the upper end of a tubular coupling 13 which telescopes over the guide tube 7. In the tube 11 is a weight 14 which bears on the top of the column of bottle caps. In the coupling 13 is a spring-holding finger 15 actuated by a cam 16 in such a manner that the spring finger will frictionally hold the bottle caps when the tube 11 and coupling 13 are removed from the machine. The weight 14 is removed and the mass of caps slide along in the packing tube 11 as the weight is drawn out, and at this time the caps in the coupling 13 pass into the tube 11. When the tube 11 is thus filled its ends are curled over just like the end of a paper cartridge over a wad, so that the bottle caps will be retained in the tube 11. The bottle caps in the guide tube 7 are prevented from falling out of the top end by a spring finger 17 actuated by a cam 18, said spring finger 17 being fixedly arranged at the top end of the tube 7.

The bottle caps are delivered to the machine in quick succession through a chute C, down which the caps drop in a fixed plane so that there is no danger of the caps entering promiscuously. Consequently, all the printed sides of the caps will be facing in the same direction, and the filled tube 11 can be placed in a bottle capping machine and the caps applied to the bottles in the usual manner, with all the printed faces of the caps uppermost.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A machine of the class described comprising a guide tube, means for feeding bottle caps into the tube, means for supporting a packing tube in alinement with the guide tube, a tubular coupling connecting the packing tube with the guide tube, and means in the coupling for engaging the caps for holding the same while the packing tube and coupling are removed from the device.

2. A machine of the class described comprising a guide tube, means for feeding bottle caps into the tube, means for supporting a packing tube in alinement with the guide tube, a tubular coupling connecting the packing tube with the guide tube, means in the coupling for engaging the caps for holding the same while the packing tube and coupling are removed from the device, and means at the discharge end of the guide tube for engaging the caps to hold the same when the coupling and packing tube are removed.

3. A machine of the class described comprising a guide tube, means for feeding bottle caps into the tube, means for supporting a packing tube in alinement with the guide tube, a tubular coupling connecting the packing tube with the guide tube, means in the coupling for engaging the caps for holding the same while the packing tube and coupling are removed from the device, means at the discharge end of the guide tube for engaging the caps to hold the same when the coupling and packing tube are removed, and a weight movable through the tubes and weighting the column of caps to hold the latter close together.

4. A machine of the class described comprising a guide tube, means for feeding bottle caps into the tube, means for supporting a packing tube spaced from the guide tube but in alinement therewith, a tubular coupling connecting the packing tube with the guide tube, means carried by the guide tube for preventing the caps from falling out of the same, and means for holding the caps in the coupling when it is removed with the packing tube from the guide tube.

5. In a machine of the class described, a guide tube, means for feeding caps into the tube, a tubular coupling for connecting a packing tube with the guide tube, a spring finger carried by the coupling, and means for forcing the finger into engagement with the caps contained in the coupling.

6. In a machine of the class described, a guide tube, means for feeding caps into the tube, a tubular coupling for connecting a packing tube with the guide tube, a spring finger carried by the guide tube, a cam forcing the finger into engagement with the caps, a spring finger carried by the coupling, and a cam for forcing the spring finger into engagement with the caps therein.

PAUL RAYMOND SIMMONS.

Witnesses:
LUKE L. BAKER,
GEO. H. BAY.